United States Patent
Fox et al.

(10) Patent No.: US 10,521,580 B1
(45) Date of Patent: Dec. 31, 2019

(54) OPEN DATA BIOMETRIC IDENTITY VALIDATION

(71) Applicant: Capital One Services, LLC, McLean, VA (US)

(72) Inventors: Ryan Fox, Lebanon, OH (US); Keith Hamburg, Reston, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/407,393

(22) Filed: May 9, 2019

(51) Int. Cl.
| | |
|---|---|
| *G06K 9/00* | (2006.01) |
| *G06F 21/32* | (2013.01) |
| *G06F 16/9535* | (2019.01) |
| *G06Q 50/26* | (2012.01) |
| *G06Q 50/00* | (2012.01) |

(52) U.S. Cl.
CPC .......... *G06F 21/32* (2013.01); *G06F 16/9535* (2019.01); *G06K 9/00288* (2013.01); *G06Q 50/01* (2013.01); *G06Q 50/265* (2013.01)

(58) Field of Classification Search
USPC ................................................ 382/115–127
See application file for complete search history.

(56) References Cited

U.S. PATENT DOCUMENTS

| | | | |
|---|---|---|---|
| 9,405,771 B2 | 8/2016 | Balakrishnan et al. | |
| 9,501,576 B2 | 11/2016 | Yu | |
| 2001/0031073 A1* | 10/2001 | Tajirna | G06K 9/00228 382/118 |
| 2006/0018520 A1* | 1/2006 | Holloran | G06Q 10/10 382/116 |
| 2011/0025710 A1* | 2/2011 | Kennedy | G06T 11/60 345/629 |
| 2016/0117404 A1* | 4/2016 | Yu | G06Q 10/107 707/740 |

FOREIGN PATENT DOCUMENTS

CN          1906640 A          1/2007

* cited by examiner

Primary Examiner — Alex Kok S Liew

(57) ABSTRACT

Various embodiments are directed to performing identity verification using biometrics and open data, such as publicly available data on the Internet. A person may provide various types of information about the person, including a name and an image of the person. An Internet search may be performed on the provided name and one or more publicly-available images corresponding to that name may be acquired. Biometric analyses may be performed on both the image provided by the person and the acquired one or more images to determine whether any of them match the person. Metadata may be extracted from a matching image. Moreover, data relating to the person may be acquired from the source of the matched image. The metadata and the data from the source may be compared with the information provided by the person to validate the identity of the person.

20 Claims, 8 Drawing Sheets

*JOHN DOE*

OPEN DATA BIOMETRIC IDENTITY VALIDATION

BACKGROUND

Synthetic identity theft is a type of fraud in which a criminal uses real (typically stolen) and/or fake information to create a new, false identity that is used to open fraudulent banking or credit accounts and make fraudulent purchases. In typical cases, a financial institution may not be able to recognize that synthetic identity theft has occurred because the fraudulent account is based on real information, and the criminal will have established a history of using the fraudulent account, sometimes responsibly, so that the account and the person behind it looks legitimate.

To prevent fraud, the financial intuition may perform identity verification, for example, by verifying a license, a passport, or other types of personal information belonging to that person. However, because the verification documents that the person provides may also be stolen or impermissibly used, conventional identity verification methods may not be sufficient in detecting or preventing the fraud. Accordingly, there is a need for an improved technique for identity validation, including the detection of false and fraudulent synthetic identities.

SUMMARY

Various embodiments are generally directed to a performing identity verification using biometrics and open data, such as publicly available data on the Internet. A person may provide various types of information about the person, including a name and an image of the person. An Internet search may be performed on the provided name and one or more publicly-available images corresponding to that name may be acquired. Biometric analyses may be performed on both the image provided by the person and the acquired one or more images to determine whether any of them match the person. Metadata may be extracted from a matching image. Moreover, data relating to the person may be acquired from the source of the matched image. The metadata and the data from the source may be compared with the information provided by the person to validate the identity of the person.

DETAILED DESCRIPTION

Figure 1:
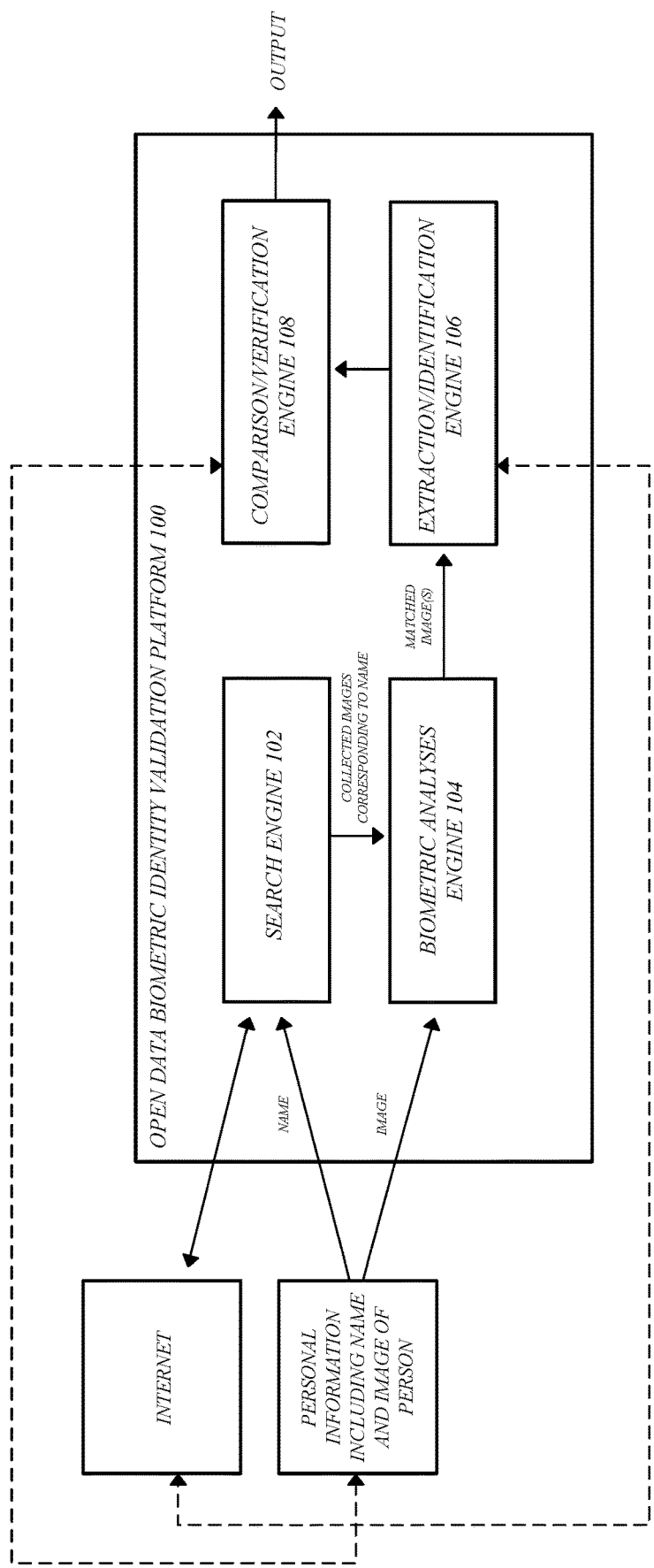
FIG. 1 illustrates an example open data biometric identity validation platform in accordance with one or more embodiments.

Various embodiments are generally directed to performing open data, biometric identity verification. Today, most people have some level of a digital or online presence. For example, various photos or digital images of a person may be available on the Internet by way of a social media account, a professional networking profile, a professional biography webpage, or the like.

In embodiments, when the person applies for a banking account, a credit card, a loan, a mortgage, etc. at a financial institution, the financial intuition may collect from the person an image or photo (digital or otherwise) of the person and other types of information related to the person, such as a full name, date of birth, a home address, a work address, employment information, spousal information, dependent information, prior addresses, education history, emergency contacts, references, etc.

An open data biometric identity verification platform or system may perform an Internet search (or any other type of search on any publicly accessible computer network) and acquire one or more publicly-available images or photos that correspond to the name of the person. It may be understood that there may be images in the acquired set or batch of photos that are not of the person. For instance, if the person has a relatively common name, more images that are not of the person may be acquired. In at least that regard, one or more biometric analyses may be performed on the acquired publicly-available images and the actual image or photo provided by the person during the application process to determine which images in the acquired set correspond to the person.

In examples, the biometric analysis of the image provided by the person may include determining at least one biological characteristic, such as a unique facial feature. For each acquired publicly-available image, a similar (or same) type of biometric analysis may be performed, e.g., determining at least one biological characteristic. An assessment of the two biometric analyses may be performed, whereby the at least one biological characteristic of the image provided by the person and the at least one biological characteristic of each acquired image are compared. Based on this comparison, it is determined whether any of the acquired publicly-available image matches the user.

For the acquired images that match the user, various types of data may be extracted from the image itself, such as metadata. Moreover, any relevant information may be obtained from the source of the image, such as a webpage. The open data biometric identity verification platform may compare the extracted metadata and/or the obtained information from the source with the information provided by the user during the application process. And based on the comparison, identity verification or any identity verification decisions may be performed and ultimately validated or confirmed. In examples, the comparison process may include assigning a match score, where meeting or exceeding a predetermined match score indicates a validated or confirmed identity verification. In additional examples, the comparison process may be run on or implemented by a risk engine or algorithm.

Previous identity verification solutions do not account for synthetic identities, nor can they catch synthetic identity fraud. The embodiments and examples described herein overcome the above problems and are advantageous over the previous solutions in that real people have digital or online footprints (whereas synthetic identities do not), information from which can be leveraged to compare against the information that the person provides during the application process. Accordingly, synthetic and/or stolen identities may be identified since an imposter, fraudster, or criminal cannot produce any image and/or information that matches the digital or online footprint.

Reference is now made to the drawings, where like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modification, equivalents, and alternatives within the scope of the claims.

FIG. 1 illustrates an example open data biometric identity validation platform 100 according to one or more embodiments. As will be further discussed below, one or more computing devices, or processing circuitry thereof, may be operable to execute instructions that provide and support the open data biometric identity validation platform 100 (hereinafter identity validation platform 100) and the various components therein.

As shown, the identity validation platform 100 includes at least a search engine 102, a biometric analyses engine 104, an extraction/identification engine 106, and a comparison/verification engine 108. A person, for example, someone who is applying for a banking account, a credit card, a loan, etc. at a financial institution, may provide various personal information to the financial institution, including the person's full name and an image (digital or otherwise) of the person, as well as other types of information such as date of birth, a home address, a work address, employment information, spousal information, dependent information, prior addresses, education history, emergency contacts, references, etc. In examples, the financial institution may require that the image of the person not be government-identification-related photographs (e.g., not from a driver's license, not from a passport, etc.) since these photographs may be stolen and/or impermissibly acquired. For instance, the image may be a "selfie" photo taken by the person at the financial institution. Moreover, the image may include one or more features or characteristics of the person's face.

According to one embodiment, the name of the person may be input to the search engine 102. The search engine 102 then searches, e.g., "crawls," the Internet for all images or photos that correspond to the person's name. It may be understood that these images may be publicly-available images on the web, such from social media website, professional networking websites, professional biography webpages, blogs, etc. The publicly-available images corresponding to the name of the person may be acquired, and input to the biometric analyses engine 104. The image of the person that was provided by the person is also input to the biometric analyses engine 104.

As will be further described below, the biometric analyses engine 104 determines whether there may be a biometric match between the image that the person provided and any of the acquired images from the Internet based on one or more comparisons between at least one biological characteristic or feature found in the images. For example, the biometric analyses engine 104 may analyze the image provided by the person and determine at least one, or a plurality of, biological characteristic(s), which may include a pupillary distance (PD), a monocular PD, a distance between or distances among an eye of the person, an ear, a nose, an upper lip, a lower lip, and/or a chin, a face width of the person, a face height of the person, and a distance between at least two veins of a retina. The same type of analysis may be performed on each of the acquired images, and the biometric analyses engine 104 may then assess the biometric analyses and further determine whether any of the acquired publicly-available images match the person. As shown, the matched publicly-available images are input to the extraction/identification engine 106.

The extraction/identification engine 106 may perform at least two different but equally important tasks. First, when applicable, the extraction/identification engine 106 may extract any metadata that may be included or associated with the matched image. For example, metadata may include a date indicating when the matched image was taken, a time-stamp, a filename associated with the matched image, a camera setting, a geolocation tag, etc. Second, when applicable, the extraction/identification engine 106 may identify, search for, and/or collect any information (personal, professional, or otherwise) from the source of the matched image. The source, for instance, may be the webpage that displays the matched image, such as a professional networking profile of the person. The professional networking profile may provide information about the person that metadata might otherwise not, such as education history, work experience, skills, activities, awards, hobbies, recommendations, and the like. As shown by the dashed double-arrow line, the extraction/identification engine 106 may also communicate with the Internet to access the source of the matched image.

The extracted metadata information and/or the information from the source of the matched image may be input to the comparison/verification engine 108, which may perform a comparison between the personal information that was provided by the person and the data and information provided by the extraction/identification engine 106. If the comparison is sufficient to indicate that the person is who the person says he or she is, then the identity verification is validated or confirmed by the comparison/verification engine 108. The comparison/verification engine may include techniques for calculating and assigning a match score that corresponds to the quality of the comparison and match. A predetermined or predefined match score may be set, and when that score is met or exceeded, then the identity verification may be validated or confirmed. As illustrated by the dashed double-arrow line, the comparison/verification engine may access the personal information provided by the person.

Figure 2B:
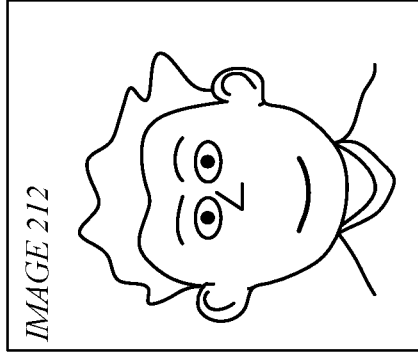
FIG. 2B illustrates an example set of publicly-available images in accordance with one or more embodiments.
Figure 2B:
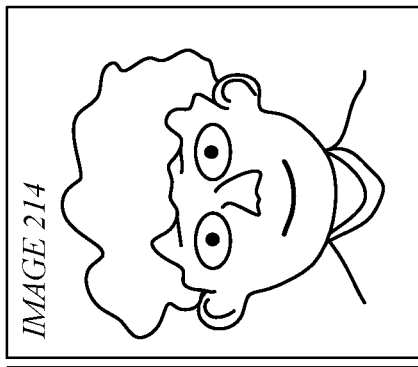
Figure 2B:
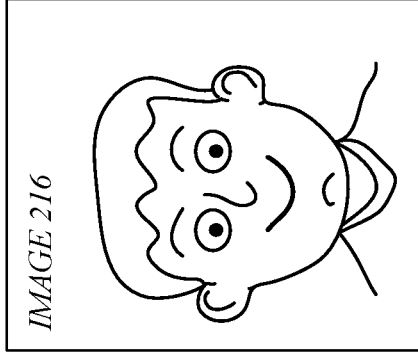
Figure 2B:
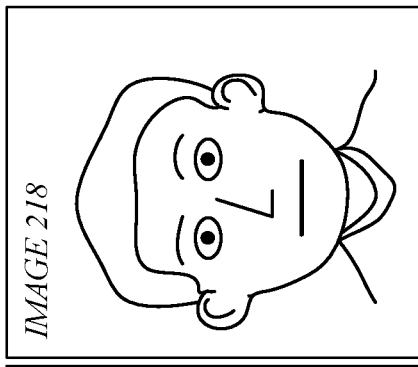
Figure 2A:
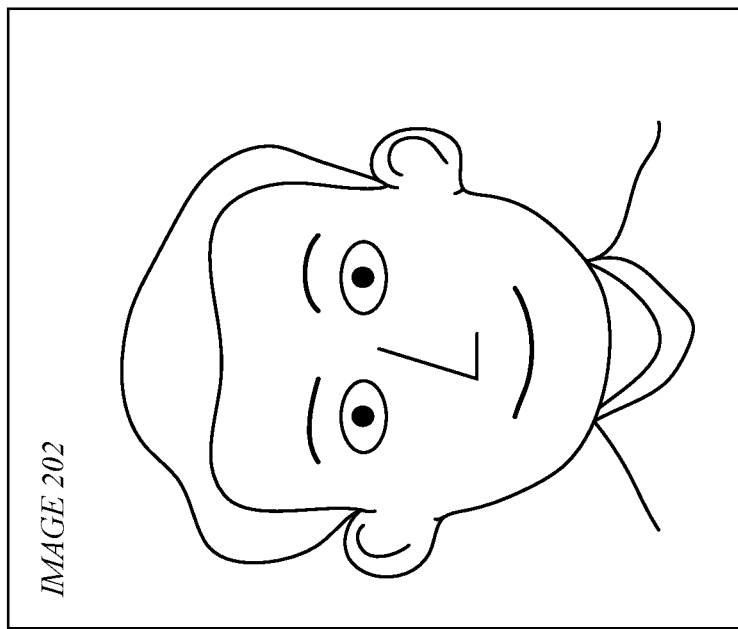
FIG. 2A illustrates an example image provided by a person in accordance with one or more embodiments.

FIG. 2A illustrates an example image 202 provided by a person according to one or more embodiments. As set forth above, this image may be the image provided by the person during the application process. As shown, the name of the person is "John Doe," which is also provided to the financial institution during the application process. The image 202 may be a headshot of the person and primarily include a variety of facial features that have different biological characteristics. As also set forth above, the image 202 may be an image that a banking associate took of the person at the financial institution, and not an image, photograph, or picture found on a government identification document such as a driver's license, passport, and the like.

FIG. 2B illustrates an example set or batch of publicly-available images according to one or more embodiments. The set or batch of these publicly-available images may have been the result of an Internet search conducted on the name "John Doe," which is the same name as described and shown in FIG. 2A. As illustrated, the set or batch includes four different images: image 212, image 214, image 216, and image 218, each showing a subject therein. Each of these images may have been identified as images that correspond to the name John Doe during the Internet search. In examples, it may be understood that the subjects in some of the acquired publicly-available images may not be the person, especially if the name, John Doe, is a very common name.

Figure 3:
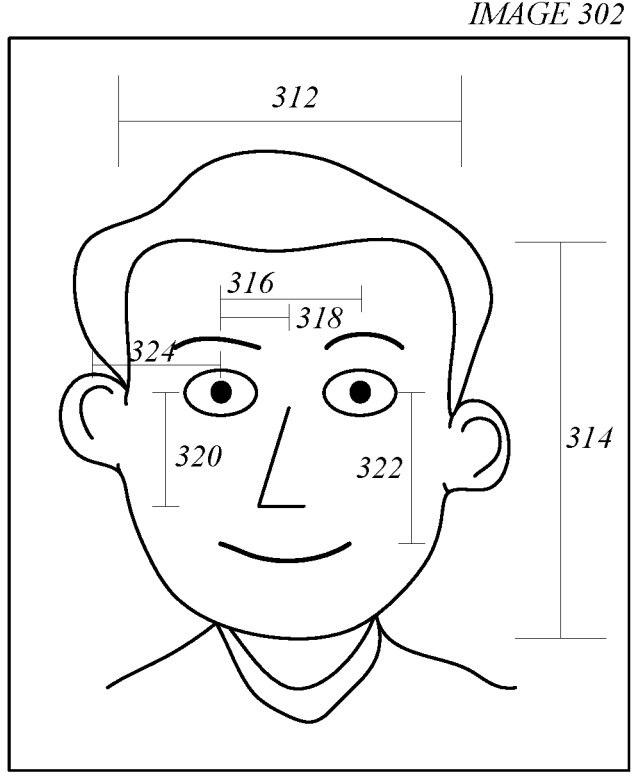
FIG. 3 illustrates an example biometric analysis on an image provided by a person in accordance with one or more embodiments.

FIG. 3 illustrates an example biometric analysis on image 302 according to one or more embodiments. As set forth above, image 302 may be the image that was provided by the person as part of the application process for a banking account, credit card, loan, mortgage, etc. The person, by way of example, may be John Doe, the same John Doe discussed above with respect to FIG. 2A. Moreover, the image 302 may be the same as image 202 illustrated in FIG. 2A, which is a headshot of John Doe.

The biometric analysis of image 302 may involve at least determining one or more biological characteristics of the person. As shown, the person's face may exhibit numerous biological characteristics. For example, the face has a face width 312, a face height 314, a distance from one pupil of one eye to the other pupil of the other eye, e.g., pupillary distance (PD) 316, a monocular PD 318, a vertical distance 320 between a pupil and bottom of the nose, a vertical distance 322 between a pupil and the lips, and a horizontal distance 324 between a pupil and an ear.

It may be understood that the person's face may exhibit many more characteristics, such as the distance between ear to ear, the distance between one part of the face to an upper lip or lower lip, length of neck, etc. It may also be understood that different types of pictures may exhibit different characteristics, for example, a profile image may reveal eye socket depth and the like. Moreover, the biological characteristics, collectively, may be unique to the person.

Figure 4:
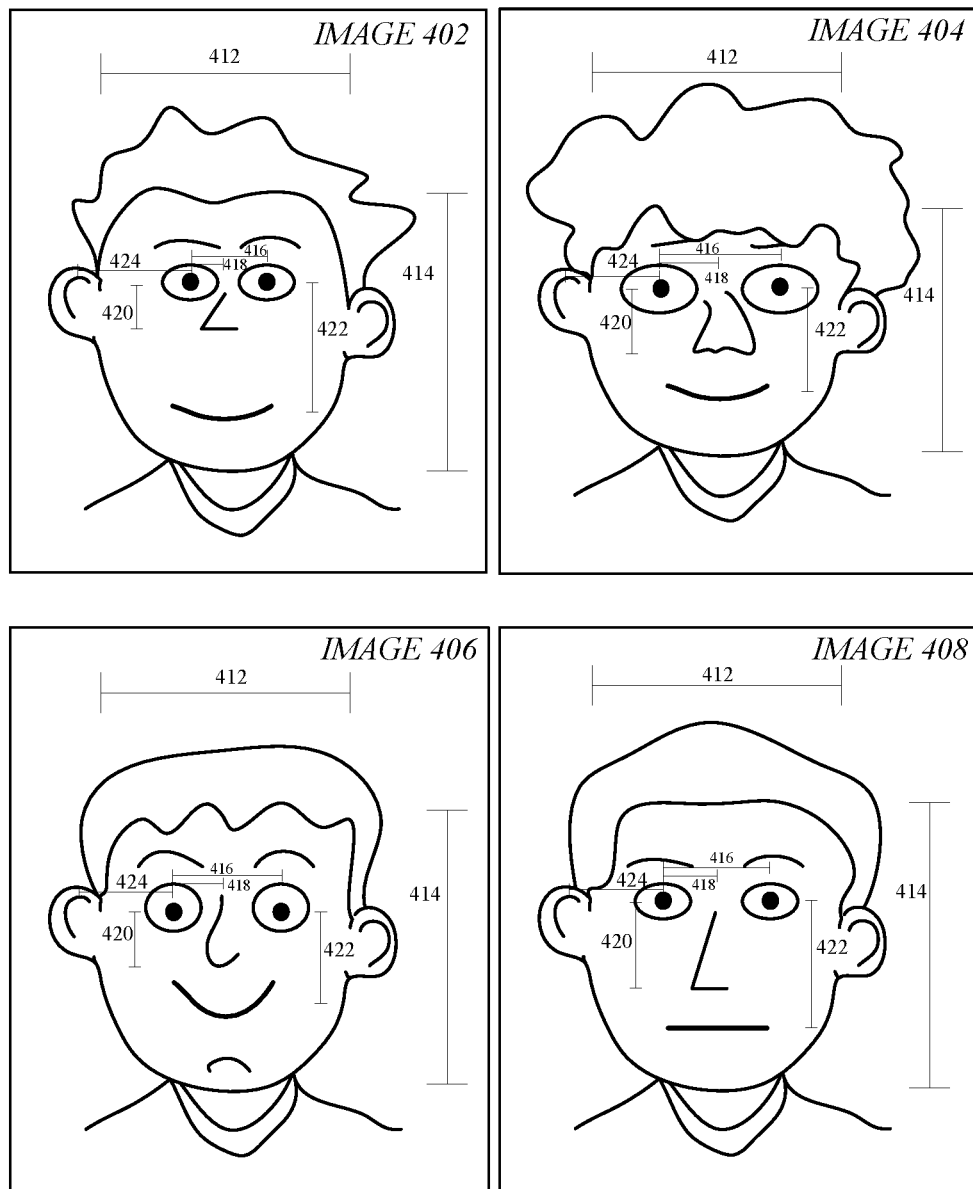
FIG. 4 illustrates an example biometric analysis on a set of publicly-available images in accordance with one or more embodiments.

FIG. 4 illustrates an example biometric analysis on a set of publicly-available images according to one or more embodiments. For instance, the acquired publicly-available images may have been the result of an Internet search conducted on the name "John Doe," which again, is the same name as described and shown in FIG. 2A. The images shown in FIG. 4 (e.g., image 402, image 404, image 406, and image 408) may be identical to the images 212, 214, 216, and 218 shown in FIG. 2B. The images 402, 404, 406, and 408 may have been identified, selected, and/or acquired as the publicly-available images that correspond to the name, John Doe, during the Internet search.

Similar to the biometric analysis illustrated in FIG. 3, the biometric analysis on the acquired publicly-available images involves at least determining one or more biological characteristics of the subject in each image. For example, each face in each acquired images has a face width 412, a face height 414, a distance from one pupil of one eye to the other pupil of the other eye, e.g., pupillary distance (PD) 416, a monocular PD 418, a vertical distance 420 between a pupil and bottom of the nose, a vertical distance 422 between a pupil and the lips, and a horizontal distance 424 between a pupil and an ear.

It may be determined that image 408 from the acquired publicly-available images matches image 302 (see FIG. 3) that was provided by the person during the application process based on an assessment of the respective biometric analyses. For instance, the assessment of the biometric analyses on image 302 and image 408 may include comparing the one or more determined biological characteristics of the person in image 302 and the subject in image 408 (e.g., the face width 312 of image 302 matches the face width 412 of image 408, the PD 316 of image 302 matches the PD 416 of image 408, etc.). A match of just one biological characteristic between the images may indicate that the subject in the acquired publicly-available image matches the person. But, it may be understood that a match of more than one biological characteristic may improve overall accuracy of the assessment. Thus, despite that the person in image 302 is smiling and the subject in image 408 not smiling, the assessment of the biological analyses reveals that the subject in image 408 is indeed the person. And while the subjects in images 402, 404, and 406 may look very similar to the person, the assessment of the biological analyses reveals that they are not the person.

Figure 5A:
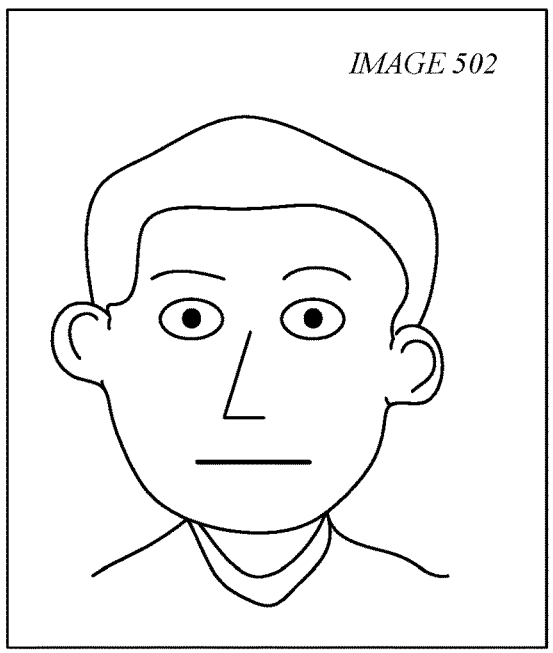
FIG. 5A illustrates an example extraction of metadata from a matched image in accordance with one or more embodiments.

FIG. 5A illustrates an example extraction of metadata from a matched image according to one or more embodiments. Upon obtaining and/or determining at least one matched image from the acquired publicly-available images, metadata from the matched image may be extracted. As shown, image 502 (which may be identical to the image 408 of FIG. 4) may include numerous and various types of metadata that can be extracted, such as a date stamp showing "8/11/2014," a time stamp showing "3:30 P.M. EST," a file name ("IMAGE_1_USER"), a camera property and/or setting ("CELL & ZOOM"), and a geotag indicating Washington, D.C.

It may be understood that other types of metadata data may be included in the matched image. For example, if the matched image is not from its original source (e.g., the image was copied from a different source), the image may contain multiple levels of metadata (e.g., metadata about other related metadata).

Figure 5B:
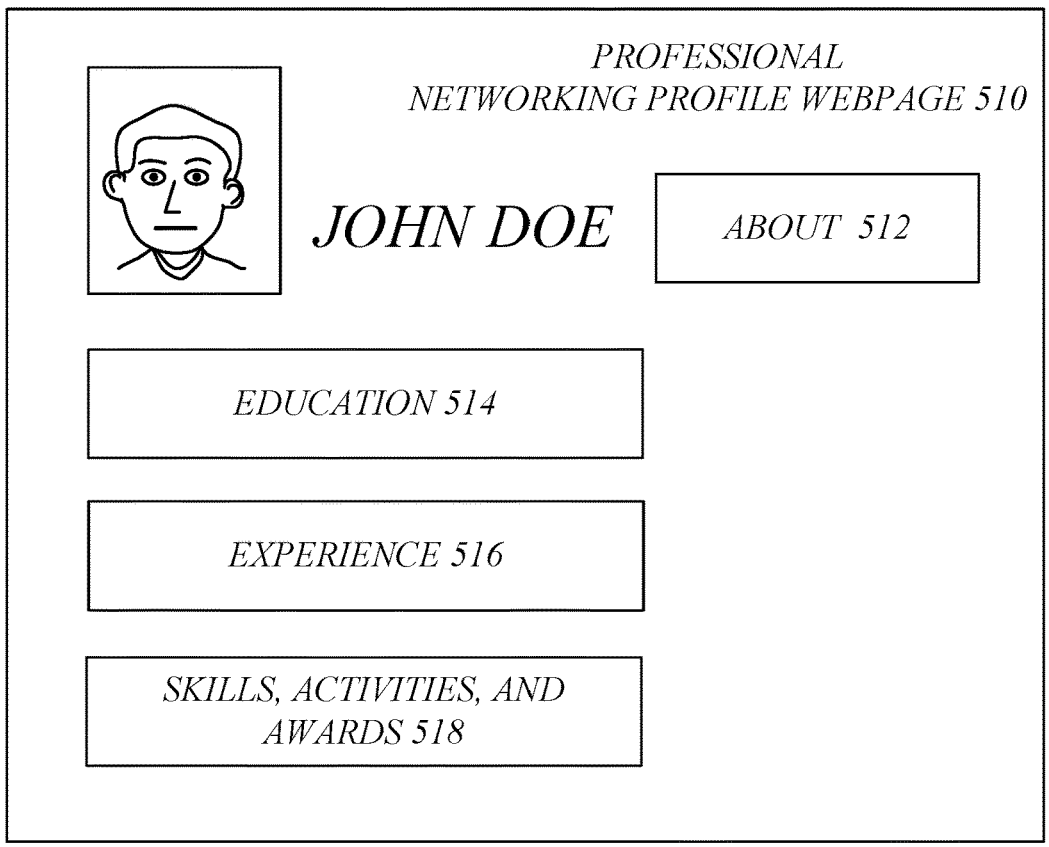
FIG. 5B illustrates an example extraction of data from a source of a matched image in accordance with one or more embodiments.

FIG. 5B illustrates an example extraction of data or information from a source of a matched image according to one or more embodiments. Non-metadata information, for instance, may be extracted from the actual source of the matched image. By way of example, the source of the matched image may be a professional networking profile webpage 510. As illustrated, the professional networking profile webpage 510 contains various types of data, such as education information 514 (e.g., high school, college, graduation school, masters, PhD, etc.), work experience information 516 (e.g., previous employers, duration of time at the previous employers, current employer, etc.), and skills, activities, and awards information 518 (e.g., languages spoken, hobbies, clubs, etc.). Moreover, the webpage 510 may include an "about" section 512 that may include more information about the person, John Doe. One or more portions of the above-described data from the webpage 510 may be identified, extracted, and/or used for identity verification.

In embodiments, the identity of the person may be verified by comparing the information that the person provided during the application process with the metadata of the matched image and/or the information from the source of the matched image. Thus, if John Doe (the person applying) is indeed the person he says he is, then his digital footprint should match the information that he provided during the application process.

In examples, the quality of the comparison between the information that the person provided during the application process with the metadata of the matched image and/or the information from the source of the matched image can be assigned a "match score." For instance, the higher the match score, the better. In some instances, an identity may be confirmed or validated only if the match score meets or exceeds a predetermined threshold match score. Moreover, it may be understood that a risk engine (e.g., a software system that provides risk measurements) or risk models may be used to confirm or validate the person's identity based on the above-described extracted metadata and/or information.

Figure 6:
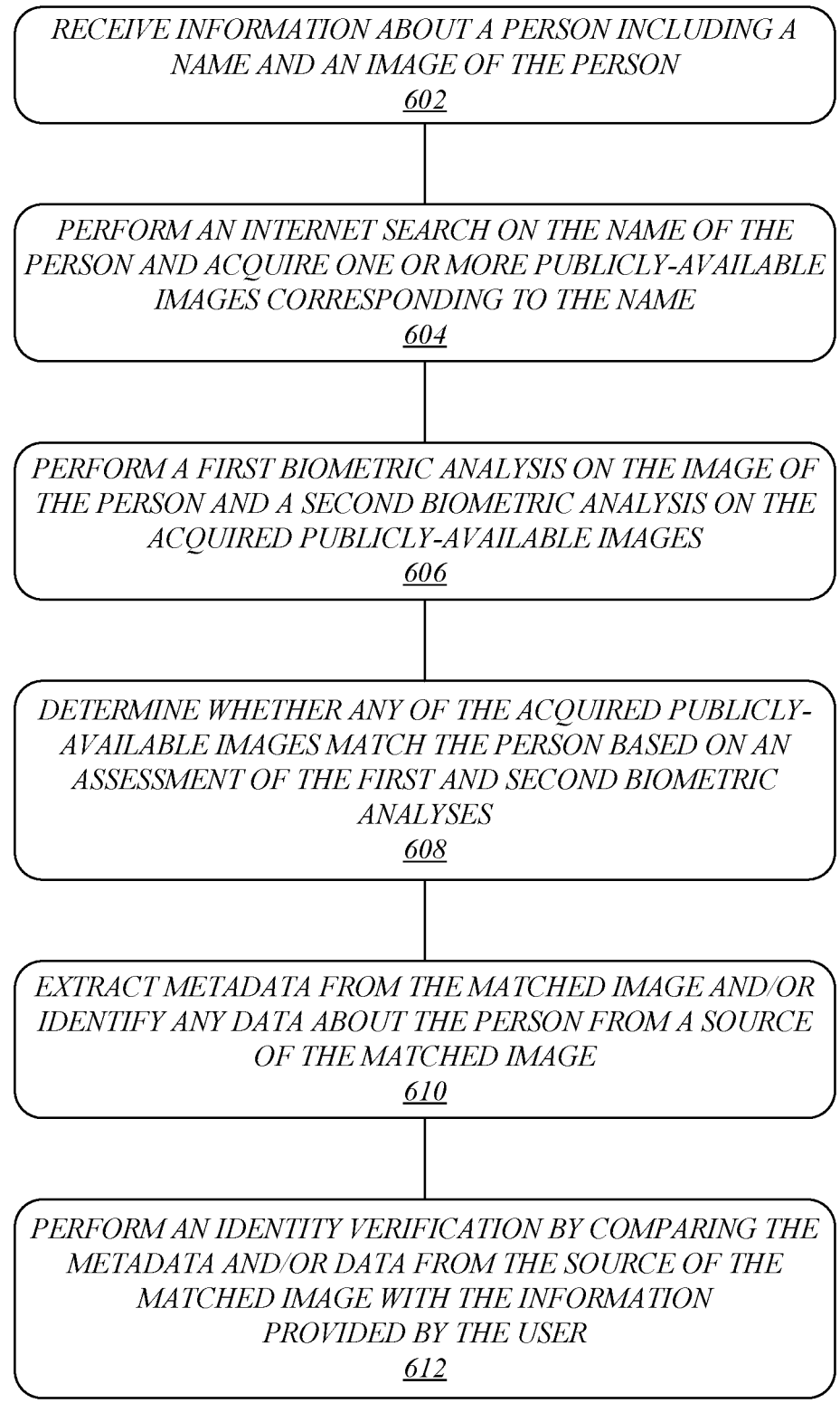
FIG. 6 illustrates an example flow diagram in accordance with one or more embodiments.

FIG. 6 illustrates a flow diagram 600 in accordance with one or more embodiments. It may be understood that the features associated with the illustrated blocks may be performed or executed by one or more computing devices and/or processing circuitry contained therein.

At block 602, information about a person may be received, including a full name of the person and an image of the person, all of which may be provided by the person. The image of the person may include a face of the person. In examples, the image of the person cannot be an image or photo from a government identification documents, such as a license, a passport, or the like, since these types of images could be easily stolen by a fraudster or criminal.

At block 604, an Internet search may be performed on the name provided by the person, and based on the search, one or more publicly-available images corresponding to the name may be acquired. For example, the search may perform an Internet "crawl" and look for images on social media websites or professional networking platforms that match the person's name.

At block 606, a first biometric analysis on the image of the person is performed. Moreover, a second biometric analysis on the acquired publicly-available images is performed. A biometric analysis may include determining at least one biological characteristic or feature of the person or subject from the image, such as a face width, a face height, a PD, a monocular PD, a vertical distance between a pupil and bottom of the nose, a vertical distance between a pupil and the lips, and a horizontal distance between a pupil and an ear, etc., all of which may be unique to the person or subject in the image. An assessment may be performed on the first and second biometric analyses, e.g., comparing the biological characteristics from the image of the person with the biological characteristics from the acquired publicly-available images to determine any of the biological characteristics match.

At block 608, it is determined whether any of the acquired publicly-available images match the person based on the assessment of the first and second biometric analyses. For example, the face height and a PD measurement determined from the image provided by the person and the face height and a PD measurement determined from an image from the acquired set of images may match, which may indicate that the subject in the image is the person undergoing the application process.

At block 610, metadata may be extracted from a matched publicly-available image. The metadata may include a geolocation tag, a timestamp, a date stamp, camera setting, etc. Moreover, data from the source of the matched publicly-available, such as a website may be identified, acquired, or extracted. For instance, the source of the matched image may be a professional networking webpage, which may contain the person's education history, work experience, and other types of information that may be used for identity verification.

At block 612, all of the metadata and the data from the source of the matched image may be compared with all of the information provided by the person during the application process. For example, the home and work addresses of the person may be compared with the geolocation tag extracted from the matched image. If the addresses and the tag correlate, then the chances of validating the person's identity increases. The same analysis may be applied to work history data identified in the social networking webpage and the work history information provided by the person during the application process, and so on. Based on the comparison, identity verification can be performed, validated, and/or confirmed. In some examples, the comparison may be performed by a risk engine or model. Moreover, a match score may be assigned to the quality of the comparison, e.g., where higher match scores indicate more accurate identity verifications.

It may be understood that the blocks illustrated in FIG. 6 are not limited to any specific order. One or more of the blocks may be performed or executed simultaneously or near simultaneously.

Figure 7:
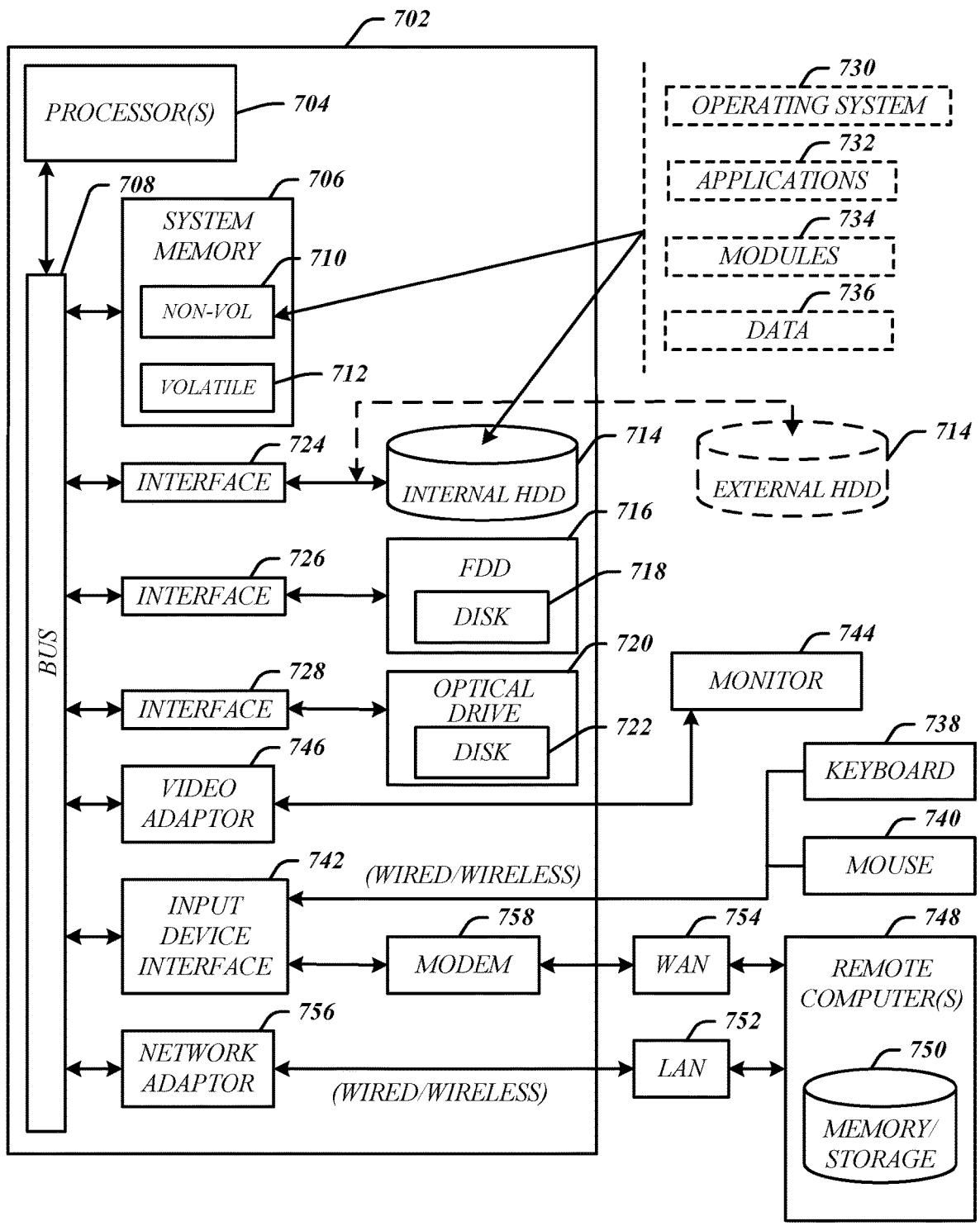
FIG. 7 illustrates an example computing architecture of a computing device in accordance with one or more embodiments.

FIG. 7 illustrates an embodiment of an exemplary computing architecture 700, e.g., of a computing device, such as a desktop computer, laptop, tablet computer, mobile computer, smartphone, etc., suitable for implementing various embodiments as previously described. In one embodiment, the computing architecture 700 may include or be implemented as part of a system, which will be further described below. In examples, the computing device and/or the processing circuitries thereof may be configured to at least execute, support, provide, and/or access the various features and functionalities of the open data biometric identity validation platform (e.g., the search engine, the biometric analyses engine, the extraction/identification engine, the comparison/verification engine, etc.). In addition to the platform, it may be understood that the computing device and/or the processing circuitries may also be configured to perform, support, or execute any of the features, functionalities, descriptions described anywhere herein.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 includes processor 704, a system memory 706 and a system bus 708. The processor 704 can be any of various commercially available processors, processing circuitry, central processing unit (CPU), a dedicated processor, a field-programmable gate array (FPGA), etc.

The system bus 708 provides an interface for system components including, but not limited to, the system memory 706 to the processor 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 800.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processor 704 through an input device interface 742 that is coupled to the system bus 708 but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756.

The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754 or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.118 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1-6 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 8:
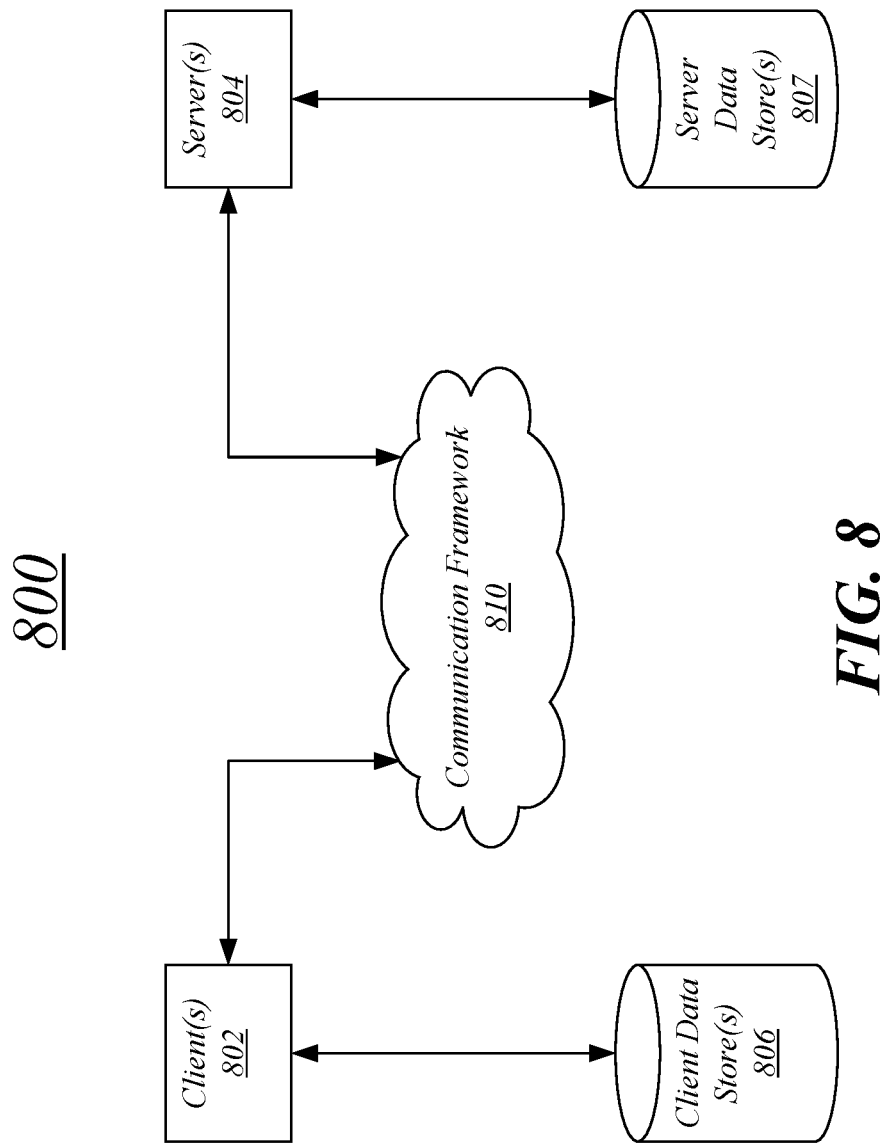
FIG. 8 illustrates an example communications architecture in accordance with one or more embodiments.

FIG. 8 is a block diagram depicting an exemplary communications architecture 800 suitable for implementing various embodiments. For example, one or more computing devices may communicate with each other via a communications framework, such as a network. At least one computing devices connected to the network may be a user computing device, such as a desktop computer, laptop, tablet computer, smartphone, etc. At least a second computing device connected to the network may be one or more server computers, which may be implemented as a back-end server or a cloud-computing server. For example, the open data biometric identity validation platform may be provisioned on one or more back-end server computers. The user computing device may access the open data biometric identity validation platform via the communications framework.

The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 includes one or more clients 802 and servers 804. The one or more clients 802 and the servers 804 are operatively connected to one or more respective client data stores 806 and server data stores 807 that can be employed to store information local to the respective clients 802 and servers 804, such as cookies and/or associated contextual information.

The clients 802 and the servers 804 may communicate information between each other using a communication framework 810. The communications framework 810 may implement any well-known communications techniques and protocols. The communications framework 810 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 810 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose and may be selectively activated or reconfigured by a computer program stored in the computer. The procedures presented herein are not inherently related to a particular computer or other apparatus. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A system comprising:
one or more computing devices, wherein the one or more computing devices comprises:
a memory to store instructions; and
processing circuitry, coupled with the memory, operable to execute the instructions, that when executed, cause the processing circuitry to:
receive information associated with a person, wherein the information includes at least a name and an image of the person;
perform an Internet search on the name of the person and acquire one or more publicly-available images corresponding to the name;
perform a first biometric analysis on the image of the person and perform a second biometric analysis on the acquired one or more publicly-available images;
determine whether any of the acquired one or more publicly-available images match the person based on an assessment of the first biometric analysis and the second biometric analysis;
extract metadata from each matched publicly-available image and/or identify any data relating to the person from a source of the matched publicly-available image;
perform a comparison between the metadata and/or the data from the source and the information associated with the person; and
perform an identity verification of the person based at least in part on the comparison.

2. The system of claim 1, wherein the image of the person includes one or more features of a face of the person.

3. The system of claim 1, wherein the information associated with the person is provided by the person and further includes one or more of the following: (i) a first, middle, and/or last name of the person, (ii) a home address, (iii) a date of birth of the person, (iv) employment information, (v)

a work address, (vi) spousal information, (vii) information on one or more dependents of the person, (viii) one or more emergency contacts of the person, (ix) education history of the person, and (x) one or more prior addresses.

4. The system of claim 1, wherein the source of the matched publicly-available is a social networking website or a professional networking website.

5. The system of claim 1, wherein the metadata includes one or more of the following: (i) a date associated with the matched image, (ii) a time associated with the matched image, (iii) a filename associated with the matched image, (iv) a camera setting associated with the matched image, and (v) a geolocation associated with the matched image.

6. The system of claim 1, wherein the first biometric analysis comprises determining at least a first biological characteristic in the image of the person, and the second biometric analysis comprises determining at least a second biological characteristic in the acquired one or more publicly available images.

7. The system of claim 6, wherein the at least first biological characteristic or the at least second biological characteristic is one or more of the following: (i) a pupillary distance (PD), (ii) a monocular PD, (iii) a distance between or distances among an eye, an ear, a nose, an upper lip, a lower lip, and/or a chin, (iv) a face width, (v) a face height, and (vi) a distance between at least two veins of a retina.

8. The system of claim 6, wherein the assessment of the first biometric analysis and the second biometric analysis comprises determining whether the at least first biological characteristic and the at least second biological characteristic match.

9. The system of claim 1, wherein the processing circuitry is further caused to determine a match score for the comparison.

10. The system of claim 1, wherein the identity verification is performed by a financial institution.

11. The system of claim 9, wherein the identity verification is validated or confirmed when the match score meets or exceeds a predefined match value.

12. The system of claim 1, wherein the data relating to the person from the source includes one or more of the following: (i) education history of the person, (ii) past or current employment information, (iii) membership associated with an organization, (iv) a hobby, (v) a skill, (vi) a language, (vii) a region or a location associated with the person, and (viii) connections of the person with other people.

13. A non-transitory computer readable medium comprising:
   a memory to store instructions; and
   processing circuitry, coupled with the memory, operable to execute the instructions, that when executed, cause the processing circuitry to:
      conduct an Internet search for and acquire one or more publicly-available images corresponding to a name of a person;
      determine whether any of the acquired one or more publicly-available images match the person based on a biometric analysis, wherein the biometric analysis comprises a biological comparison of the person in an image provided by the person and a subject depicted in the acquired one or more publicly-available images;
      extract metadata for each matched publicly-available image and/or identify any data relating to the person from a source of the matched publicly-available image;
      compare the extracted metadata and/or the data relating to the person from the source with information provided by the person; and
      verify an identity of the person based on the comparison.

14. The non-transitory computer readable medium of claim 13, wherein the information provided by the person includes one or more of the following: (i) a first, middle, and/or last name of the person, (ii) a home address, (iii) a date of birth of the person, (iv) employment information, (v) a work address, (vi) spousal information, (vii) information on one or more dependents of the person, (viii) one or more emergency contacts of the person, (ix) education history of the person, (x) one or more prior addresses, and (xi) the image of the person.

15. The non-transitory computer readable medium of claim 13, wherein the source of the matched publicly-available is a social networking website or a professional networking website.

16. The non-transitory computer readable medium of claim 13, wherein the biological comparison comprises comparing at least a first biological characteristic of the person in the image and at least a second biological characteristic of the subject in the acquired one or more publicly-available images.

17. A method comprising:
   conducting an Internet search for one or more publicly-available images corresponding to a name of a person;
   determining, via processing circuitry, whether a subject depicted in the one or more publicly-available images matches the person based on biometric analyses of the subject in the one or more publicly-available images and an image of the person;
   extracting metadata for each matched one or more publicly-available images and/or identifying any data related to the person from a website providing the matched one or more publicly-available images;
   comparing, via the processing circuitry, the extracted metadata and/or data related to the person with information provided by the person; and
   performing, via the processing circuitry, an identity verification of the person based on the comparison.

18. The method of claim 17, wherein the information provided by the person includes one or more of the following: (i) a first, middle, and/or last name of the person, (ii) a home address, (iii) a date of birth of the person, (iv) employment information, (v) a work address, (vi) spousal information, (vii) information on one or more dependents of the person, (viii) one or more emergency contacts of the person, (ix) education history of the person, (x) one or more prior addresses, and (xi) the image of the person.

19. The method of claim 17, wherein the metadata includes one or more of the following: (i) a date associated with the matched image, (ii) a time associated with the matched image, (iii) a filename associated with the matched image, (iv) a camera setting associated with the matched image, and (v) a geolocation associated with the matched image.

20. The method of claim 17, wherein the data related to the person from the website includes one or more of the following: (i) education history of the person, (ii) past or current employment information, (iii) membership associated with an organization, (iv) a hobby, (v) a skill, (vi) a language, (vii) a region or a location associated with the person, and (viii) connections of the person with other people.

* * * * *

UNITED STATES PATENT AND TRADEMARK OFFICE
CERTIFICATE OF CORRECTION

PATENT NO. : 10,521,580 B1
APPLICATION NO. : 16/407393
DATED : December 31, 2019
INVENTOR(S) : Ryan Fox Page 1 of 1

It is certified that error appears in the above-identified patent and that said Letters Patent is hereby corrected as shown below:

In the Claims

Claim 1, Line 22 - Please replace "extract metadata from each matched publicly-available image and/or identify any data relating to the person from a source of the matched publicly-available image; perform a comparison between the metadata and/or the data from the source and the information associated with the person;" with --extract any metadata from each matched publicly-available image and identify any data relating to the person from a source of each matched publicly-available image; perform a comparison between (i) the metadata and the data from the source and (ii) the information associated with the person;--

Claim 13, Line 17 - Please replace "extract metadata for each matched publicly-available image and/or identify any data relating to the person from a source of the matched publicly-available image; compare the extracted metadata and/or the data relating to the person from the source with information provided by the person;" with --extract any metadata for each matched publicly-available image and identify any data relating to the person from a source of each matched publicly-available image; compare (i) the extracted metadata and the data relating to the person from the source with (ii) information provided by the person;--

Claim 17, Line 9 - Please replace "extracting metadata for each matched one or more publicly-available images and/or identifying any data related to the person from a website providing the matched one or more publicly-available images; comparing, via the processing circuitry, the extracted metadata and/or data related to the person with information provided by the person;" with --extracting any metadata for each matched one or more publicly-available images and identifying any data related to the person from a website providing each matched one or more publicly-available images; comparing, via the processing circuitry, (i) the extracted metadata and the data related to the person with (ii) information provided by the person;--

Signed and Sealed this
Tenth Day of March, 2020

Andrei Iancu
*Director of the United States Patent and Trademark Office*